(12) United States Patent
Zierolf

(10) Patent No.: US 9,140,818 B2
(45) Date of Patent: Sep. 22, 2015

(54) METHOD AND APPARATUS FOR DETERMINING POSITION IN A PIPE

(75) Inventor: Joseph A. Zierolf, Houma, LA (US)

(73) Assignee: Marathon Oil Company, Houston, TX (US)

( * ) Notice: Subject to any disclaimer, the term of this patent is extended or adjusted under 35 U.S.C. 154(b) by 0 days.

(21) Appl. No.: 13/302,618

(22) Filed: Nov. 22, 2011

(65) Prior Publication Data

US 2012/0298243 A1  Nov. 29, 2012

Related U.S. Application Data

(63) Continuation of application No. 12/564,780, filed on Sep. 22, 2009, now abandoned, and a continuation of application No. 10/887,366, filed on Jul. 6, 2004, now abandoned, and a continuation of application No. 10/032,114, filed on Dec. 21, 2001, now Pat. No. 6,759,968, and a continuation of application No. 09/286,650, filed on Apr. 6, 1999, now Pat. No. 6,333,699.

(60) Provisional application No. 60/098,284, filed on Aug. 28, 1998.

(51) Int. Cl.
| | |
|---|---|
| *G01V 3/30* | (2006.01) |
| *E21B 17/00* | (2006.01) |
| *E21B 47/09* | (2012.01) |
| *E21B 23/00* | (2006.01) |

(52) U.S. Cl.
CPC .............. *G01V 3/30* (2013.01); *E21B 17/006* (2013.01); *E21B 47/09* (2013.01); *E21B 23/00* (2013.01)

(58) Field of Classification Search
USPC ................... 340/854.8, 825.72, 572.1, 539.1; 106/255.1, 250.01, 254.2; 342/42
See application file for complete search history.

(56) References Cited

U.S. PATENT DOCUMENTS

| | | | |
|---|---|---|---|
| 3,684,008 | A | 8/1972 | Garrett |
| 3,706,094 | A | 12/1972 | Cole et al. |

(Continued)

FOREIGN PATENT DOCUMENTS

| | | |
|---|---|---|
| EP | 0013494 A1 | 7/1980 |
| EP | 0412535 B1 | 2/1991 |

(Continued)

OTHER PUBLICATIONS

Den-Con Tool Co., General Catalog, 1994-95, pp. 1-3.

(Continued)

*Primary Examiner* — Albert Wong
(74) *Attorney, Agent, or Firm* — Jack E. Ebel

(57) ABSTRACT

A method and apparatus for determining position in a pipe provides for the precise determination of location and associated characteristics of each pipe joint of a well, cross country pipeline or other fluid transmission line. The system includes a passive or active radio identification device at each joint in the pipe or casing string. The devices are preferably sealed within the resilient seal positioned between each pipe or casing joint. A pipeline tool includes a radio transmitter and receiver, with the transmitter transmitting on a frequency selected for resonating the identification devices. The resonant response of each device is detected by a receiver in the pipeline tool, with the response transmitted to the surface via the wireline to which the tool is connected. Alternatively, the tool may include storage information means until the tool can be recovered from the well or pipe.

19 Claims, 4 Drawing Sheets

(56) References Cited

U.S. PATENT DOCUMENTS

| | | |
|---|---|---|
| 4,023,167 A | 5/1977 | Wahlstrom |
| 4,096,477 A | 6/1978 | Epstein et al. |
| 4,119,146 A | 10/1978 | Taylor |
| 4,166,215 A | 8/1979 | Anderson |
| 4,166,216 A | 8/1979 | Cubberly, Jr. |
| 4,271,925 A | 6/1981 | Burg |
| 4,372,378 A | 2/1983 | Powers, Jr. |
| 4,535,430 A | 8/1985 | Cochrane et al. |
| 4,572,293 A | 2/1986 | Wilson et al. |
| 4,599,182 A | 7/1986 | Young et al. |
| 4,622,463 A | 11/1986 | Hill |
| 4,630,044 A | 12/1986 | Polzer |
| 4,656,463 A | 4/1987 | Anders et al. |
| 4,656,944 A | 4/1987 | Gonzalez |
| 4,698,631 A | 10/1987 | Kelly, Jr. et al. |
| 4,808,925 A | 2/1989 | Baird |
| 4,827,395 A | 5/1989 | Anders et al. |
| 4,837,515 A | 6/1989 | Nishihara et al. |
| 4,977,961 A | 12/1990 | Avashti |
| 5,029,644 A | 7/1991 | Szarka |
| 5,047,632 A | 9/1991 | Hunt |
| 5,105,742 A | 4/1992 | Sumner |
| 5,130,705 A | 7/1992 | Allen et al. |
| 5,142,128 A | 8/1992 | Perkin et al. |
| 5,160,925 A | 11/1992 | Dailey et al. |
| 5,182,939 A | 2/1993 | Chien et al. |
| 5,191,936 A | 3/1993 | Edwards et al. |
| 5,202,680 A | 4/1993 | Savage |
| 5,206,680 A | 4/1993 | Dillow |
| 5,230,387 A | 7/1993 | Waters et al. |
| 5,279,366 A | 1/1994 | Scholes |
| 5,354,956 A | 10/1994 | Orban et al. |
| 5,355,957 A | 10/1994 | Burleson et al. |
| 5,361,838 A | 11/1994 | Kilgore |
| 5,394,141 A | 2/1995 | Soulier |
| 5,457,447 A | 10/1995 | Ghaem et al. |
| 5,467,083 A | 11/1995 | McDonald et al. |
| 5,479,860 A | 1/1996 | Ellis |
| 5,495,237 A | 2/1996 | Yuasa et al. |
| 5,497,140 A | 3/1996 | Tuttle |
| 5,505,134 A | 4/1996 | Brooks et al. |
| 5,530,358 A | 6/1996 | Wisler et al. |
| 5,608,199 A | 3/1997 | Clouse, III et al. |
| 5,621,647 A | 4/1997 | Kraemer et al. |
| 5,626,192 A | 5/1997 | Connell et al. |
| 5,629,623 A | 5/1997 | Sezginer et al. |
| 5,654,693 A | 8/1997 | Cocita |
| 5,660,232 A | 8/1997 | Reinhardt |
| 5,680,459 A | 10/1997 | Hook et al. |
| 5,680,905 A | 10/1997 | Green et al. |
| 5,682,099 A | 10/1997 | Thompson et al. |
| 5,682,143 A | 10/1997 | Brady et al. |
| 5,706,896 A | 1/1998 | Tubel et al. |
| 5,720,345 A | 2/1998 | Price et al. |
| 5,829,538 A | 11/1998 | Wesson et al. |
| 5,836,406 A | 11/1998 | Schuh |
| 5,864,323 A | 1/1999 | Berthon |
| 5,877,996 A | 3/1999 | Krokstad et al. |
| 5,911,277 A | 6/1999 | Hromas et al. |
| 5,923,167 A | 7/1999 | Chang et al. |
| 5,931,239 A | 8/1999 | Schuh |
| 5,939,885 A | 8/1999 | McClure et al. |
| 5,955,666 A | 9/1999 | Mullins |
| 5,991,602 A | 11/1999 | Sturm |
| 5,995,449 A | 11/1999 | Green et al. |
| 6,018,501 A | 1/2000 | Smith et al. |
| 6,025,780 A | 2/2000 | Bowers et al. |
| 6,078,259 A | 6/2000 | Brady et al. |
| 6,081,729 A | 6/2000 | Bauerschmidt et al. |
| 6,085,805 A | 7/2000 | Bates |
| 6,097,301 A | 8/2000 | Tuttle |
| 6,105,688 A | 8/2000 | Vaynshteyn et al. |
| 6,125,934 A | 10/2000 | Lenn et al. |
| 6,130,602 A * | 10/2000 | O'Toole et al. ............ 340/10.33 |
| 6,135,206 A | 10/2000 | Gano et al. |
| 6,151,961 A | 11/2000 | Huber et al. |
| 6,158,532 A | 12/2000 | Logan et al. |
| 6,176,318 B1 | 1/2001 | Drakeley et al. |
| 6,181,138 B1 | 1/2001 | Hagiwara et al. |
| 6,184,685 B1 | 2/2001 | Paulk et al. |
| 6,189,621 B1 | 2/2001 | Vail, III |
| 6,243,041 B1 | 6/2001 | Mischenko et al. |
| 6,249,258 B1 | 6/2001 | Bloch et al. |
| 6,253,842 B1 | 7/2001 | Connell et al. |
| 6,257,338 B1 | 7/2001 | Kilgore |
| 6,288,548 B1 | 9/2001 | Thompson et al. |
| 6,288,685 B1 | 9/2001 | Thomas |
| 6,324,904 B1 | 12/2001 | Ishikawa et al. |
| 6,333,699 B1 | 12/2001 | Zierolf |
| 6,333,700 B1 | 12/2001 | Thomeer et al. |
| 6,343,649 B1 | 2/2002 | Beck et al. |
| 6,359,569 B2 | 3/2002 | Beck et al. |
| 6,366,089 B1 | 4/2002 | Poitzsch et al. |
| 6,426,917 B1 | 7/2002 | Tabanou et al. |
| 6,429,653 B1 | 8/2002 | Kruspe et al. |
| 6,443,228 B1 | 9/2002 | Aronstam et al. |
| 6,450,258 B2 | 9/2002 | Green et al. |
| 6,476,609 B1 | 11/2002 | Bittar |
| 6,481,505 B2 | 11/2002 | Beck et al. |
| 6,497,280 B2 | 12/2002 | Beck et al. |
| 6,515,919 B1 | 2/2003 | Lee |
| 6,531,871 B1 | 3/2003 | Hay et al. |
| 6,536,524 B1 | 3/2003 | Snider |
| 6,575,237 B2 | 6/2003 | Purkis et al. |
| 6,577,244 B1 | 6/2003 | Clark et al. |
| 6,588,505 B2 | 7/2003 | Beck et al. |
| 6,597,175 B1 | 7/2003 | Brisco |
| 6,614,229 B1 | 9/2003 | Clark et al. |
| 6,670,880 B1 * | 12/2003 | Hall et al. ..................... 336/132 |
| 6,717,501 B2 | 4/2004 | Hall et al. |
| 6,759,968 B2 | 7/2004 | Zierolf |
| 6,761,219 B2 | 7/2004 | Snider et al. |
| 6,766,703 B1 | 7/2004 | Kluth et al. |
| 6,788,263 B2 | 9/2004 | Clark et al. |
| 6,822,579 B2 | 11/2004 | Goswami et al. |
| 6,915,848 B2 | 7/2005 | Thomeer et al. |
| 6,943,697 B2 | 9/2005 | Ciglenec et al. |
| 6,989,764 B2 | 1/2006 | Thomeer et al. |
| 7,014,100 B2 | 3/2006 | Zierolf |
| 7,063,148 B2 | 6/2006 | Jabusch |
| 7,159,654 B2 * | 1/2007 | Ellison et al. ............ 166/250.01 |
| 7,268,688 B2 | 9/2007 | Juds |
| 7,283,061 B1 | 10/2007 | Snider et al. |
| 7,400,263 B2 | 7/2008 | Snider et al. |
| 7,677,439 B2 | 3/2010 | Zierolf |
| 7,688,210 B2 * | 3/2010 | Staff ......................... 340/572.8 |
| 7,714,741 B2 | 5/2010 | Snider et al. |
| 8,001,858 B2 * | 8/2011 | Cogen et al. ................. 73/865.8 |
| 8,044,820 B2 | 10/2011 | Snider et al. |
| 8,091,775 B2 | 1/2012 | Zierolf |
| 8,850,899 B2 | 10/2014 | Snider |
| 2001/0013410 A1 | 8/2001 | Beck et al. |
| 2001/0013411 A1 | 8/2001 | Beck et al. |
| 2001/0042617 A1 | 11/2001 | Beck et al. |
| 2001/0043146 A1 | 11/2001 | Beck et al. |
| 2001/0054969 A1 | 12/2001 | Thomeer et al. |
| 2002/0007949 A1 | 1/2002 | Tolman et al. |
| 2002/0014966 A1 | 2/2002 | Strassner et al. |
| 2002/0093431 A1 | 7/2002 | Zierolf |
| 2002/0133942 A1 | 9/2002 | Kenison et al. |
| 2002/0158120 A1 | 10/2002 | Zierolf |
| 2003/0058125 A1 | 3/2003 | Ciglenec et al. |
| 2003/0090390 A1 | 5/2003 | Snider et al. |
| 2004/0211567 A1 | 10/2004 | Aud |
| 2004/0239521 A1 | 12/2004 | Zierolf |
| 2005/0115708 A1 | 6/2005 | Jabusch |
| 2005/0237200 A1 | 10/2005 | Bellum et al. |
| 2006/0175404 A1 | 8/2006 | Zierolf |
| 2008/0271887 A1 | 11/2008 | Snider et al. |
| 2009/0223663 A1 | 9/2009 | Snider et al. |
| 2009/0223670 A1 | 9/2009 | Snider |
| 2010/0013664 A1 | 1/2010 | Zierolf |
| 2010/0171593 A1 | 7/2010 | Zierolf |

(56) References Cited

U.S. PATENT DOCUMENTS

| | | | |
|---|---|---|---|
| 2010/0193184 | A1 | 8/2010 | Dolman et al. |
| 2010/0219980 | A1 | 9/2010 | Snider et al. |
| 2011/0252878 | A1 | 10/2011 | Snider |

FOREIGN PATENT DOCUMENTS

| | | | |
|---|---|---|---|
| EP | 0651132 | A2 | 5/1995 |
| EP | 0730083 | A2 | 9/1996 |
| EP | 1152262 | A1 | 11/2001 |
| FR | 1033631 | | 7/1953 |
| SU | 1657627 | A1 | 6/1991 |
| WO | 0045195 | | 8/2000 |
| WO | 01/18357 | A2 | 3/2001 |
| WO | 01/73423 | A1 | 10/2001 |
| WO | 20061101618 | A2 | 9/2006 |
| WO | 20091114356 | A1 | 9/2009 |
| WO | 20111130176 | A1 | 10/2011 |

OTHER PUBLICATIONS

Varpakhovich G A; RU 2057334C1: Method of Identification of Objects and Plant for its Realization; Mar. 27, 1996; pp. 1-2; Derwent Record.
U.S. Office Communication from U.S. Appl. No. 09/286,650 dated Jul. 3, 2000.
U.S. Office Communication from U.S. Appl. No. 09/286,650 dated Jan. 12, 2001.
U.S. Office Communication from U.S. Appl. No. 09/286,650 dated Oct. 12, 2001.
U.S. Office Communication from U.S. Appl. No. 09/586,648 dated Dec. 18, 2003.
U.S. Office Communication from U.S. Appl. No. 09/586,648 dated Aug. 26, 2004.
U.S. Office Communication from U.S. Appl. No. 09/586,648 dated Sep. 29, 2005.
U.S. Office Communication from U.S. Appl. No. 09/656,720 dated Feb. 26, 2002.
U.S. Office Communication from U.S. Appl. No. 09/843,998 dated Aug. 29, 2002.
U.S. Office Communication from U.S. Appl. No. 09/843,998 dated Mar. 28, 2003.
U.S. Office Communication from U.S. Appl. No. 09/843,998 dated Dec. 9, 2003.
U.S. Office Communication from U.S. Appl. No. 09/843,998 dated Jul. 28, 2004.
U.S. Office Communication from U.S. Appl. No. 09/843,998 dated Mar. 24, 2005.
U.S. Office Communication from U.S. Appl. No. 10/032,114 dated Aug. 13, 2003.
U.S. Office Communication from U.S. Appl. No. 10/032,114 dated Feb. 24, 2004.
U.S. Office Communication from U.S. Appl. No. 10/323,536 dated Dec. 27, 2006.
U.S. Office Communication from U.S. Appl. No. 10/323,536 dated May 14, 2007.
U.S. Office Communication from U.S. Appl. No. 10/323,536 dated Feb. 5, 2008.
U.S. Office Communication from U.S. Appl. No. 10/323,536 dated Apr. 11, 2008.
U.S. Office Communication from U.S. Appl. No. 10/726,027 dated Jul. 11, 2005.
U.S. Office Communication from U.S. Appl. No. 10/887,366 dated Dec. 5, 2006.
U.S. Office Communication from U.S. Appl. No. 10/887,366 dated May 17, 2007.
U.S. Office Communication from U.S. Appl. No. 10/887,366 dated Aug. 21, 2007.
U.S. Office Communication from U.S. Appl. No. 10/887,366 dated Nov. 23, 2007.
U.S. Office Communication from U.S. Appl. No. 10/887,366 dated Jun. 18, 2008.
U.S. Office Communication from U.S. Appl. No. 10/887,366 dated Nov. 10, 2008.
U.S. Office Communication from U.S. Appl. No. 10/887,366 dated Apr. 22, 2009.
U.S. Office Communication from U.S. Appl. No. 11/377,736 dated Oct. 18, 2006.
U.S. Office Communication from U.S. Appl. No. 11/377,736 dated May 7, 2007.
U.S. Office Communication from U.S. Appl. No. 11/377,736 dated Nov. 11, 2007.
U.S. Office Communication from U.S. Appl. No. 11/377,736 dated Jun. 12, 2008.
U.S. Office Communication from U.S. Appl. No. 11/377,736 dated Dec. 12, 2008.
U.S. Office Communication from U.S. Appl. No. 11/377,736 dated May 29, 2009.
U.S. Office Communication from U.S. Appl. No. 12/044,087 dated Apr. 22, 2010.
U.S. Office Communication from U.S. Appl. No. 12/044,087 dated Jul. 30, 2010.
U.S. Office Communication from U.S. Appl. No. 12/044,087 dated Jan. 13, 2011.
U.S. Office Communication from U.S. Appl. No. 12/102,687 dated Aug. 2, 2010.
U.S. Office Communication from U.S. Appl. No. 12/102,687 dated Nov. 5, 2010.
U.S. Office Communication from U.S. Appl. No. 12/102,687 dated Apr. 6, 2011.
U.S. Office Communication from U.S. Appl. No. 12/173,693 dated Feb. 25, 2009.
U.S. Office Communication from U.S. Appl. No. 12/173,693 dated Jun. 4, 2009.
U.S. Office Communication from U.S. Appl. No. 12/173,693 dated Aug. 21, 2009.
U.S. Office Communication from U.S. Appl. No. 12/564,780 dated Mar. 16, 2011.
U.S. Office Communication from U.S. Appl. No. 12/725,254 dated Jun. 4, 2010.
U.S. Office Communication from U.S. Appl. No. 12/725,254 dated Nov. 2, 2010.
U.S. Office Communication from U.S. Appl. No. 12/725,254 dated Apr. 14, 2011.
U.S. Office Communication from U.S. Appl. No. 12/044,087 dated May 24, 2011.
U.S. Office Communication from U.S. Appl. No. 12/044,087 dated Dec. 5, 2011.
U.S. Office Communication from U.S. Appl. No. 12/102,687 dated Oct. 20, 2011.
U.S. Office Communication from U.S. Appl. No. 12/564,780 dated Aug. 24, 2011.
U.S. Office Communication from U.S. Appl. No. 12/044,087 dated Feb. 28, 2014.
U.S. Office Communication from U.S. Appl. No. 12/102,687 dated Jan. 13, 2014.
U.S. Office Communication from U.S. Appl. No. 13/081,926 dated Jan. 8, 2014.
U.S. Appl. No. 12/044,087 dated Jun. 17, 2014.
U.S. Appl. No. 12/044,087 dated Oct. 27, 2014.
U.S. Office Communication from U.S. Appl. No. 12/102,687 dated Jun. 19, 2012.
U.S. Office Communication from U.S. Appl. No. 12/102,687 dated Aug. 1, 2013.
U.S. Office Communication from U.S. Appl. No. 13/081,926 dated Sep. 10, 2013.

* cited by examiner

METHOD AND APPARATUS FOR DETERMINING POSITION IN A PIPE

REFERENCE TO RELATED PATENT APPLICATION

This application is a continuation of and claims the benefit of U.S. patent application Ser. No. 12/564,780, filed on Sep. 22, 2009 and entitled "Method and Apparatus for Determining Position in Pipe", now abandoned, which in turn is a continuation of and claims the benefit of U.S. patent application Ser. No. 10/887,366, filed on Jul. 6, 2004 and entitled "Method and Apparatus for Determining Position in Pipe", now abandoned, which in turn is a continuation of and claims the benefit of U.S. patent application Ser. No. 10/032,114, filed on Dec. 21, 2001 and entitled "Method and Apparatus for Determining Position in Pipe", now U.S. Pat. No. 6,759,968, which in turn is a continuation of and claims the benefit of U.S. patent application Ser. No. 09/286,650, filed Apr. 6, 1999 and entitled "Method and Apparatus for Determining Position in Pipe", now U.S. Pat. No. 6,333,699, which in turn claims the benefit of U.S. Provisional Patent Application Ser. No. 60/098,284, filed on Aug. 28, 1998.

This application is related to the following patent applications: U.S. patent application Ser. No. 09/586,648, filed on Jun. 1, 2000, entitled "Method and System for Performing Operations and for Improving Production in Wells", and issued on Oct. 16, 2007 as U.S. Pat. No. 7,283,061; U.S. patent application Ser. No. 12/173,693, filed on Jul. 15, 2008 and entitled "Method and System for Performing Operations and for Improving Production in Wells", and issued on May 11, 2010 as U.S. Pat. No. 7,714,741; U.S. patent application Ser. No. 09/656,720, filed on Sep. 7, 2000, entitled "Method and System for Performing a Casing Conveyed Perforating Process and Other Operations in Wells", and issued on Mar. 25, 2003 as U.S. Pat. No. 6,536,524; U.S. patent application Ser. No. 09/843,998, filed on Apr. 27, 2001, entitled "Process and Assembly for Identifying and Tracking Assets", and issued on Mar. 21, 2006 as U.S. Pat. No. 7,014,100; U.S. patent application Ser. No. 11/377,736, filed on Mar. 16, 2006, entitled "Process and Assembly for Identifying and Tracking Assets", and issued on Mar. 16, 2010 as U.S. Pat. No. 7,677,439; U.S. patent application Ser. No. 12/725,254, filed on Mar. 16, 2010, entitled "Process and Assembly for Identifying and Tracking Assets", and issued on Jan. 10, 2012 as U.S. Pat. No. 8,091,775; U.S. patent application Ser. No. 10/323,536, filed on Dec. 18, 2002, entitled "Method and System for Performing Operations and for Improving Production in Wells", and issued on Jul. 15, 2008 as U.S. Pat. No. 7,400,263; U.S. patent application Ser. No. 10/726,027, filed on Dec. 1, 2003, entitled "Method and System for Transmitting Signals Through a Metal Tubular", and issued on Jun. 20, 2006 as U.S. Pat. No. 7,063,148; U.S. patent application Ser. No. 09/536,953, filed on Mar. 28, 2000, entitled "Apparatus and Method for Downhole Well Equipment and Process Management Identification, and Actuation", and issued on Dec. 25, 2001 as U.S. Pat. No. 6,333,700; U.S. patent application Ser. No. 12/044,087, filed on Mar. 7, 2008 and entitled "Systems, Assemblies and Processes for Controlling Tools in a Well Bore"; U.S. patent application Ser. No. 12/102,687, filed on Apr. 14, 2008, entitled "Systems, Assemblies and Processes for Controlling Tools in a Well Bore"; and, U.S. patent application Ser. No. 12/777,779, filed on May 11, 2010, entitled "Method and System for Performing Operations and for Improving Production in Wells", and issued on Oct. 25, 2011 as U.S. Pat. No. 8,044,820.

BACKGROUND OF INVENTION

1. Field of the Invention

The present invention relates generally to devices for detecting intermediate points within wells, gas and oil pipelines, and the like, and more specifically to a system using radio frequency resonant devices installed at various points in the well or pipe. A detector is inserted into the pipe, and detects the resonant devices where installed to transmit location or depth and other information back to a station at the surface or along the pipe. The present invention may provide for the storage of the information gathered for downloading upon retrieval of the device from the well or pipe.

2. Description of the Related Art

The need for accurate measurement of the depth of a drilled well is critical, as oftentimes the stratum of interest in the well, resides within a relatively narrow band. Wells are typically cased after drilling, with cement being poured between the casing and the wall of the drilled hole in order to seal and stabilize the hole. The casing and cement are perforated at the desired depth in order to access the stratum of interest (oil bearing deposits, gas, water, etc.), with the casing and cement serving to prevent the flow and mixing of undesired fluids with the fluid of interest from the well (e.g., water with oil, etc.).

In view of the above, it is critical that the well be perforated at precisely the proper depth in order to avoid drawing an undesirable fluid into the well, and/or missing the desired stratum of interest in the well. As wells typically extend from a few to several thousand feet below the surface in the case of oil and gas wells, the precise measurement of the depth of the well to within a few feet, poses a difficult problem. U.S. Pat. No. 5,279,366 provides an excellent and detailed discussion of the problem in the Background of the Invention, columns 1 through 4, for further background.

Accordingly, numerous devices and systems have been developed in the past for logging or measuring the precise depth of the well, for perforating the well or for other purposes as required. Such principles as MRI (magnetic resonance imaging), gamma ray detection, and others, have been utilized in order to enable a detector lowered into the well casing to determine its position or depth within the hole. However, none of the systems or principles utilized in the past, provide the needed accuracy to enable an operator to determine precisely the depth of the tool within the hole. It is very easy for the well to be logged incorrectly, or for the tool to detect the wrong joint or point in the casing, and thus throw off all calculations and measurements accordingly. As the conventional well casing pipe has a length of some thirty feet, it will be seen that an error in the detection of one joint location, could cause a perforating gun or other tool to miss the stratum of interest completely.

Those skilled in the art are aware that the limitations of the prior art extend to other types of pipelines and the like, and are not limited only to generally vertical well bores. For example, the standard procedure for examining a cross-country oil, gas, or other pipeline, is to "pig" the line, i.e., send a mechanical device (called a "pig") through the line, generally by pneumatic means. The "pig" may sense various information relating to the condition of the line, or other factors, which information may be stored within the device until it is recovered at some point in the line. However, any flaws or other problems in the line must be identified as to location, and the mechanical "pigs" used for such operations have no means of determining their position in the line. Rather, their location must be detected externally, by a worker stationed along the pipe or line as the "pig" travels through the line, and who logs the passage of the "pig" at various points along the line, relative to time. By knowing the time that any information was gathered in the pipe, and the time of passage of the "pig" at various points, the location of any anomalies may be indirectly determined.

However, it will be seen that it can be difficult to determine the precise location of various anomalies or other points of interest in such a pipeline, as the detection of the passage of the "pig" through the line, is determined at only a relatively few widely separated points along the line. Thus, when the record of the recovered "pig" is examined, it may not be possible to narrow the location of some point of interest in the line, to an area smaller than perhaps a few hundred feet of pipeline, or perhaps more.

Accordingly, a need will be seen for a system which positively identifies the location or depth of a well tool at various points within the well. The system comprises a plurality of passive or active radio frequency resonant devices, which are installed at several, or all, of the joints in the well casing. Each of the devices is preferably constructed or tuned to provide a unique individual signal. A well tool is provided which transmits a low power and/or directional signal on an appropriate frequency for reception by the devices, which then resonate to provide a responding signal to the well tool. The responding signal passes up the wire line to the well operator at the surface, who is able to determine precisely the location or depth of the well tool in the well. Alternatively, the information may be stored within the downhole tool, for downloading into a computer or other suitable reading device at the surface, after recovery of the tool.

A further need will be seen for a system which is capable of positively identifying the location of a tool which is passed through a pipeline or the like, and recording the location corresponding to the tool at various points in time as the tool passes through the pipeline. The system may utilize active or passive radio frequency resonant devices, with information being stored within the pipeline tool for later recovery when the tool is recovered from the line.

A discussion of the related art of which the present inventor is aware, and its differences and distinctions from the present invention, is provided below.

U.S. Pat. No. 4,572,293 issued on Feb. 25, 1986 to James G. Wilson et al., titled "Method Of Placing Magnetic Markers On Collarless Cased Wellbores," describes the magnetic polarizing of well casing by positioning one or more electromagnets within the casing, and activating the electromagnets to impart a permanent magnetic field at the location of the electromagnet(s) within the casing or pipe. The magnetically polarized area may be detected using a conventional magnetic reading casing collar locator. The Wilson et al. method does not provide any means of differentiating between magnetically marked spots, nor of precisely positioning the magnetically polarized areas at predetermined points in the casing. Moreover, Wilson et al. do not disclose any means of logging or determining the position of a device in a cross country or other fluid pipeline, as provided by the present method and apparatus.

U.S. Pat. No. 4,630,044 issued on Dec. 16, 1986 to Rudolf Polzer, titled "Programmable Inductively Coupled Transponder," describes a passive radio identification device (PRID) including a memory for modulating the response signal when triggered by an appropriate transmitter. Polzer describes the placement of the resonating transponder on a moving object, e.g., a railroad car, with the triggering transmitter having a stationary mounting. This configuration is precisely the opposite of the present invention, with its stationary responding devices and triggering transmitter being mounted within a moving well hole or pipeline "pigging" tool. Moreover, Polzer makes no suggestion of using his invention for determining depth or other characteristics in a well casing or other fluid pipeline, as provided by the present invention.

U.S. Pat. No. 4,808,925 issued on Feb. 28, 1989 to Gary K. Baird, titled "Three Magnet Casing Collar Locator," describes a magnetic device for detecting pipe or casing joints in a well. The device provides a specially shaped toroidal magnetic field, which magnetically affects the ferrometallic casing and casing joints. A detector associated with the device detects variations in the magnetic field as the field changes as it passes each casing joint. Baird makes no provision for detecting any differences in the joints. Rather, each joint appears essentially the same when detected, and the operator cannot determine precisely where in the casing the device is located. Each joint must be counted in order for the location to be determined, and no other information is provided by the Baird device. Baird does not disclose any means of logging or determining the precise location of a pigging tool in a cross country or other than vertical fluid pipeline, as provided by the present invention.

U.S. Pat. No. 5,279,366 issued on Jan. 18, 1994 to Patrick L. Scholes, titled "Method For Wireline Operation Depth Control In Cased Wells," describes the use of both magnetic and radioactive location markers in a well casing. The detector device is capable of detecting both high energy radiation (gamma rays) and magnetic anomalies, thus making it easier to confirm that well depth logs using either system separately, are properly "tied in." The Scholes '366 U.S. patent provides an excellent explanation of the problem of well depth control and logging, as well as the importance of a solution for the problem, in the Background of the Invention portion of the disclosure, as noted further above. However, Scholes does not provide any means of differentiating between different joints or other locations along the length of the casing, nor any radio frequency resonant means for doing so. Moreover, Scholes is silent regarding any form of logging or determining the position of a tool in other than a vertical line, whereas the present system may be applied to any fluid line in a generally vertical or other than vertical orientation.

U.S. Pat. No. 5,361,838 issued on Nov. 8, 1994 to Marion D. Kilgore, titled "Slick Line Casing And Tubing Joint Locator Apparatus And Associated Methods," describes a device which is usable with a slick line, i.e., a monofilament metal or other line which does not carry an electrical signal. The device relies upon an integral magnetic anomaly detector for detecting pipe or casing joints. When a joint is detected, the device drives a drag producing structure against the inner surface of the casing, with the drag registering as a momentary increase in tension on the line at the surface as the device passes the joint. Thus, the Kilgore device can only be used when being drawn upwardly through the pipe, and does not utilize any radio frequency resonance means. The Kilgore device is also unworkable in other than a generally vertical line, whereas the present system is operable in any fluid line, regardless of its orientation.

U.S. Pat. No. 5,457,447 issued on Oct. 10, 1995 to Sanjar Ghaem et al., titled "Portable Power Source And RF Tag Utilizing Same," describes a radio frequency (RF) device providing an interrogation signal and receiving a response from the interrogation signal. The device may be powered by any one or more of several electrical sources, including conventional battery power, solar or infrared cells, etc. However, Ghaem et al. are silent regarding a responding unit for their RF tag device. While the present invention makes use of an RF transmitter and receiver disposed within a well downhole tool, pipeline pigging tool, or the like, the present invention also makes use of inert or active resonant responding devices which are triggered by the RF transponder device of the well or pipeline tool, which resonant responding devices are not a part of the Ghaem et al. disclosure.

U.S. Pat. No. 5,497,140 issued on Mar. 5, 1996 to John R. Tuttle, titled "Electrically Powered Postage Stamp Or Mailing Or Shipping Label Operative With Radio Frequency (RF) Communication," describes a small and very thin radio receiver and transmitter, including a memory chip for modulating the transmitted signal to provide certain specific information, e.g., routing, etc. The Tuttle disclosure provides for a thin, flat battery for power of the device, and accordingly includes "sleep" and "wake" circuitry which is triggered by a transmission from another device. The present invention does not require any integral electrical power in the specific form of an electric battery, but resonates when power is received from a nearby transmitter. The present device may include active circuitry requiring electrical power, but the electrical power is generated by electrochemical means using the fluid within the well or pipe, as an electrolyte. The Tuttle device is not a resonant device.

U.S. Pat. No. 5,626,192 issued on May 6, 1997 to Michael L. Connell et al., titled "Coiled Tubing Joint Locator And Methods," describes a tube which is lowered into the well pipe string for locating pipe joints. The device includes a fluid passage formed generally axially therethrough, and an electromagnetic joint detector which senses the increased mass of each joint, according to the disclosure. When a joint is detected, a lateral valve is opened, which decreases the fluid flow resistance through the device and produces a pressure drop which is transmitted to the surface. The Connell et al. device can only sense each joint, and cannot detect any difference between different joints, whereas the present device may provide means for differentiating between different joints in the well casing or fluid pipeline.

U.S. Pat. No. 5,720,345 issued on Feb. 24, 1998 to Timothy M. Price et al., titled "Casing Joint Detector," describes a magnetic anomaly detector which detects the variations in magnetic flux across pipe or casing joints, as in other devices of the prior art discussed further above. The detector may also measure the distance traveled down the borehole, and correlate this distance with the number of joints passed. However, Price et al. make no provision for distinguishing between different casing or pipe joints, for determining precisely which joint is being passed at any given point. Also, as with other magnetic anomaly detectors, the device must be moving at some minimum velocity through the casing in order to generate the spike in electromagnetic energy for generating a detection signal. The present active or passive RF system is operable at any practicable velocity in vertical, horizontal, or otherwise oriented fluid pipelines of virtually any type, i.e., ferromagnetic or other material.

European Patent Publication No. 013,494 published on Jul. 23, 1980 to British Gas Corporation, titled "Measurement Of Velocity And/Or Distance," describes a device which produces a magnetic anomaly in the wall of a ferrometallic pipe, and then detects the anomaly as the device passes. The device may thus measure its velocity through the pipe, by measuring the time between the production of the magnetic anomaly and its detection by another part of the device, with the distance between the two components being known. As in other devices using magnetic principles or means discussed further above, the British Gas device cannot distinguish between different magnetic anomalies produced thereby, but can only count the total number of magnetic anomalies along the length of the pipe and provide a distance measurement based upon the distance between the magnetic anomaly producer and detector. No RF means, nor use in other than a generally vertical downhole, is disclosed in the British Gas Corporation patent publication.

European Patent Publication No. 412,535 published on May 11, 1994 to Michael L. Smith, titled "Tubing Collar Position Sensing Apparatus, And Associated Methods, For Use With A Snubbing Unit," describes a device for electromagnetically detecting tubing or joint collars for progressively opening and closing the blowout pressure seals of a blowout valve. Accordingly, there is no need, and no teaching, of any means for distinguishing between different joints along the length of the tube or pipe. Smith notes that the measurement of the pipes cannot be accomplished by odometer means alone, due to slight variations in pipe length and in the length of engaged threads at each coupling, to which problem the present invention responds. Moreover, the present system is adaptable to both generally vertical well holes, as well as generally horizontal or other orientation gas and other fluid lines.

European Patent Publication No. 651,132 published on May 3, 1995 to the Halliburton Company, titled "Method For Locating Tubular Joints In A Well," describes a device which applies lateral pressure to the walls of the pipe whenever a joint is detected. The increased drag of the device increases the tension on the line as the device is raised up the pipe, thus enabling the joints to be detected without requirement for an electrical connection between the device in the pipe and the surface. The device described in the '132 European Patent Publication is the same as that described in the '838 U.S. patent, and discussed further above. The same differences and distinctions noted in the above discussion, are also seen to apply here.

Finally, European Patent Publication No. 730,083 published on Sep. 4, 1996 to the Halliburton Company, titled "Method And Apparatus For Use In Setting Barrier Member In Well," describes a device using conventional magnetic anomaly detection means for detecting pipe or casing joints, for positioning a barrier within the pipe or casing so that the barrier is not positioned on the joint. There is no need, and no teaching, for the device to distinguish between different joints, as all that is necessary for the Halliburton device is to determine that the barrier or seal will not be positioned directly on a joint.

None of the above inventions and patents, taken either singly or in combination, is seen to describe the instant invention as claimed.

SUMMARY OF THE INVENTION

The present invention comprises a method and apparatus for determining position in a pipe or the like, for detecting pipe or casing joints in an oil, gas, or other drilled well or pipe, and for distinguishing between joints. The system includes a passive radio identification device (PRID), or alternatively an active device, installed at each pipe or casing joint, with a well or pipeline tool including a radio frequency transmitter and receiver. The transmitter of the tool provides a constant transmission signal, which is attenuated or directionally modified so as to be received only by an identification device at an immediately adjacent pipe or casing joint. When the device receives the transmission from the tool, the identification device circuit resonates to transmit a response, which is received by the tool receiver. The signal received by the receiver is then transmitted up the wireline between the tool and the surface, where it is processed. Alternatively, the tool may include means for recording the information received, with the information being downloaded from the tool upon retrieval of the tool at the surface or access point in a pipeline.

Information relating to each of the radio identification devices may be stored at the surface, with the operator being able to determine the location of the downhole tool at any time, and other characteristics which have been logged into the computer or information system, such as pipe or casing size, geological characteristics or stratum at any particular point as previously logged and entered into the system, depth of the well at that point, etc. Again, the present system is adaptable for use in generally horizontal fluid (oil, gas, water, etc.) pipelines as well as generally vertical downholes, and may be used in pipes of virtually any non-horizontal or non-vertical orientation as well. The present invention may also utilize identification devices which provide a distinct signal from one another, in order that the downhole tool is able to distinguish between each device, and therefore the joint with which any particular device is associated and the physical characteristics previously logged at that location.

While passive radio identification devices (PRIDs) which resonate when a specific frequency or frequencies are detected, may be used in the present invention, the present method and apparatus may also make use of active devices, i.e., devices requiring electrical power for operation. The present invention provides such electrical power in the form of an electrical battery, with two dissimilar metals being provided in the resonant device, or the resonant device and tool, with the fluid within the well or pipe serving as an electrolyte for the device.

Accordingly, it is a principal object of the invention to provide an improved method and apparatus for determining position in a pipe or the like, utilizing a radio frequency transmitter and receiver in a downhole or pipeline tool, with passive radio identification devices (PRIDs) or active devices located at each joint in the pipe or casing.

It is another object of the invention to provide an improved pipeline position determining method and apparatus which may include an information storage and retrieval system, such as a computer, at the surface or outside the pipeline, with the downhole or pipeline tool transmitting a signal to the system whenever a radio frequency identification device is detected.

Yet another object of the invention is to provide an improved pipeline position determining method and apparatus which may use a tool having recording means therein, for recording information detected during tool passage through the pipe, and for downloading the information from the tool recording means upon recovery of the tool.

It is a further object of the invention to provide an improved pipeline position determining method and apparatus which computer or other information system is programmed with various facts relating to each of the identification devices in the well or pipe, such as the stratum or geological characteristics at each identification device installed in the well, the pipe or casing diameter, distance between each of the identification devices in the pipe or casing string, etc.

An additional object of the invention is to provide an improved pipeline position determining method and apparatus which identification devices may be distinguished from one another, in order that the tool distinguishes the specific identification device with which it is communicating at any given location in the well or pipe.

Still another object of the invention is to provide an improved pipeline position determining method and apparatus which may utilize resilient seals disposed between each pipe or casing joint, for holding each of the identification devices in place.

Another object of the invention is to provide an improved pipeline position determining method and apparatus which may utilize active RF identification devices which draw electrical power from an electrochemical source provided by dissimilar metals in the RF device and/or tool, with the fluid within the well or pipe serving as an electrolyte.

It is an object of the invention to provide improved elements and arrangements thereof in an apparatus for the purposes described which is inexpensive, dependable and fully effective in accomplishing its intended purposes.

These and other objects of the present invention will become apparent upon review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises a method and apparatus for determining position in a pipe or the like, for oil, gas, and other drilled wells having a jointed casing therein, and for cross country pipelines and other non-vertical gas, oil, water, and other fluid wells and pipelines. The present system provides for the determination of the precise location of a well or pipe tool within the casing or pipe, and associated characteristics of the well or pipe at the location of the tool.

Figure 1:
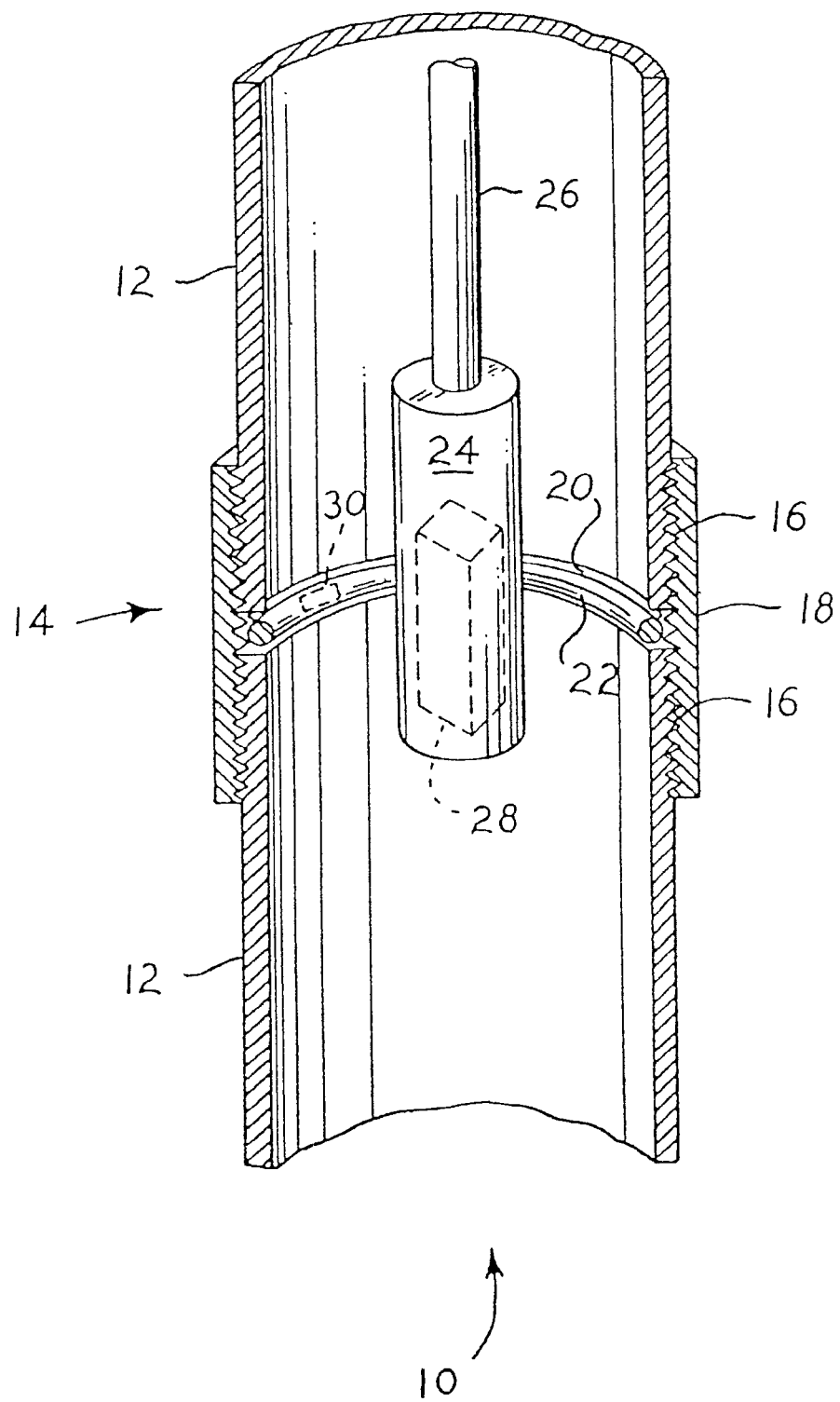
FIG. 1 is a broken away perspective view in section, of a section of well casing and joint including the installation of a radio identification device therein, and downhole tool including radio transceiver means therein for communicating with the device.
Figure 2:
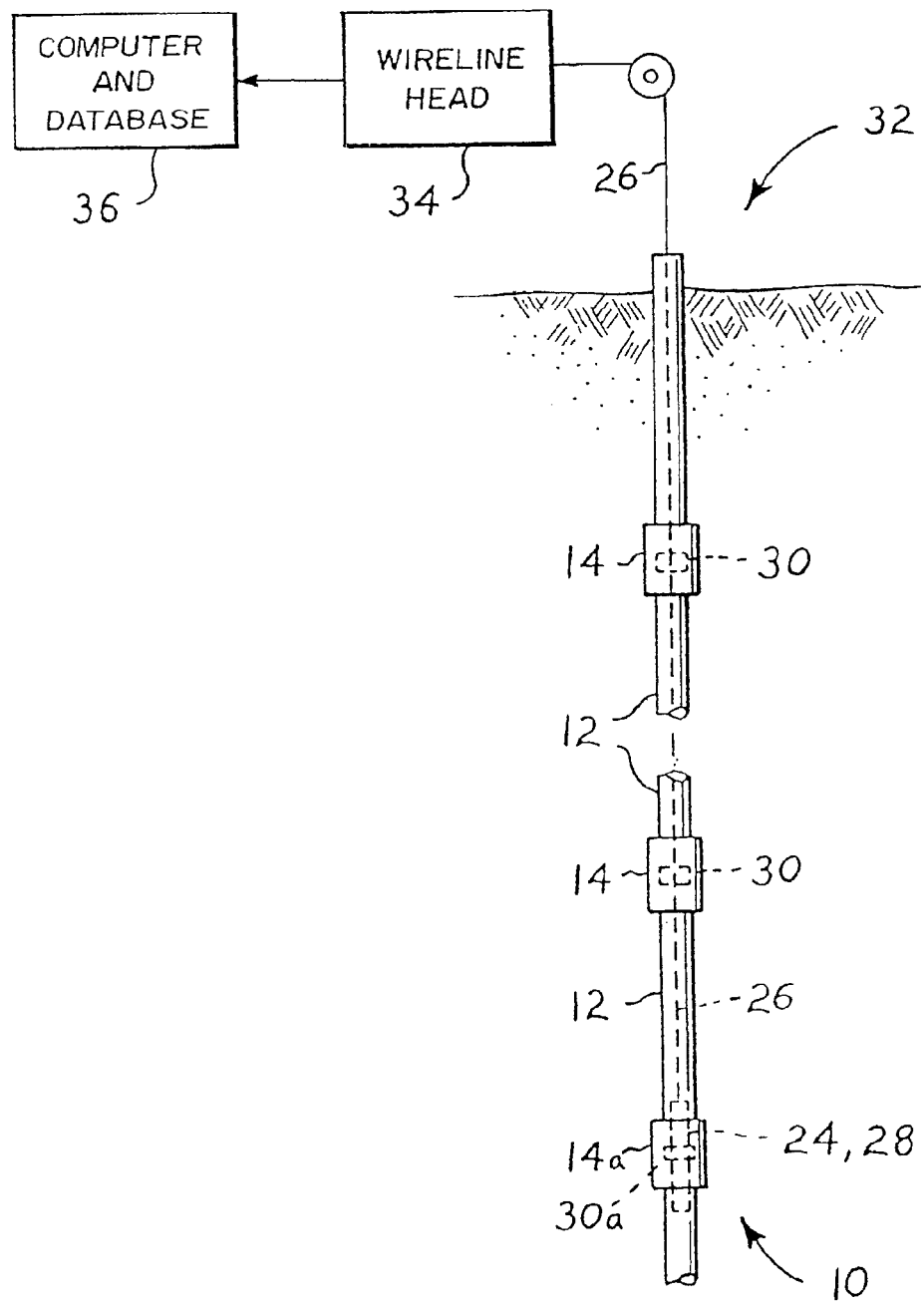
FIG. 2 is a schematic elevation view of a drilled well and casing, showing the general operation of one embodiment of the present invention and its communication with the surface and surface components associated with the invention.

FIG. 1 provides a broken away perspective view in section of a well casing or pipe 10 formed of a plurality of sections 12, with each section 12 having a joint 14 therebetween comprising externally threaded connecting ends 16 with an internally threaded mating coupling sleeve 18 securing the two ends 16 together. Such joints 14 generally include at least a slight gap 20 between each connecting end 16 of the casing or pipe sections 12, with a resilient O-ring 22 being placed in the gap 20 at the time of assembly of the joint 14. A well downhole tool 24 is also shown in FIG. 1, at the lower end of a wireline 26 which serves both to support the tool 24 within the casing 10 and also for electrical power and communication between the tool 24 and the surface, as shown in FIG. 2 and discussed further below.

The well tool 24 includes a radio frequency transmitter and receiver 28 therein, shown in broken lines in FIG. 1. A radio frequency identification device 30 is installed at each of the coupling joints 14 of the pipe or casing string 10, as by sealing, imbedding, or otherwise securing the device 30 within the resilient O-ring seal 22 at each joint 14. The radio frequency identification device 30 may be in the form of a passive radio identification device (known as a "PRID"). Such PRIDs are conventional and are used for merchandise security in the retail industry, library security, etc., and generally comprise a solid state printed circuit which is configured to resonate upon receipt of radio frequency energy from a radio transmission of appropriate frequency and strength. Such devices do not require any additional power source, as the energy received from the transmission provides sufficient power for the device to respond with a weak and/or periodic reply transmission so long as it is receiving an appropriate transmission.

Alternatively, the responding device 30 may be in the form of an active device, requiring a separate source of electrical power (e.g., electrical storage battery or other electrical power means). Such devices are also conventional, and may be configured to draw practically no electrical power until a radio frequency signal is received, whereupon they are electrically energized to produce a responding transmission.

The transceiver 28 enclosed within the well tool 24 is also conventional, and provides a radio frequency transmitted signal at the appropriate frequency to excite the PRID or active device 30 at any given joint 14 location. The transceiver 28 also includes a receiver tuned to receive the response from the PRID or active device 30, which response is provided on a different frequency than the transmission frequency used by the transceiver 28 in order that the transmitted signal from the transceiver 28 does not interfere with the received signal from the PRID or active device 30. The transmitter and antenna system of the transceiver 28 are preferably configured to provide a relatively weak signal which can only be detected and responded to by a PRID or active device 30 in relatively close proximity to the transceiver 28, i.e., within a foot or so distant.

Alternatively, the antenna of the transceiver 28 may be configured to provide a highly directional signal, e.g., radially polarized or shielded to provide only a narrow radial transmission pattern, so the transmitted signal from the transceiver 28 radiates essentially horizontally from the transceiver 28 and well tool 24. In this manner, the transceiver 28 will not trigger more than a single PRID or active device 30 at any point in the passage of the transceiver 28 through the casing pipe string 10, and will be in very close proximity, e.g., within a few inches, of the exact depth of the responding PRID or active device 30. Alternatively, the receiving antenna may provide only a narrow radial reception band for accuracy.

FIG. 2 provides a schematic elevation view of a drilled well 32 including a casing string 10 installed therein. The wireline 26 is shown extended from the conventional wireline head 34 (comprising a reel and/or other extension and retraction means for the wireline 26, and conventional means for communicating electrical power and signals to and from the wireline 26 and thus to the well tool 24 at the lower end thereof), with the well tool 24 disposed at a specific joint 14a having a specific PRID or active device 30a installed therein. The radio frequency transmission of the transceiver 28 triggers a response from the adjacent PRID or active device 30a, causing the device 30a to resonate according to the transmitted frequency from the transceiver 28 and to transmit a responding signal on a different frequency. The different frequency of the responding device 30a transmission is detected by the receiver portion of the transceiver 28 in the well tool 24, and is relayed back to the wireline head 34 for processing at the surface.

In many instances, the line 26 used to lower the tool 24 into the hole, and to withdraw the tool 24 from the hole, is a non-electric line. Accordingly, tools 24 used with such non-electric lines include recording means therein, with the data recorded by the recording means being downloaded to the remotely located computer and database after recovery of the tool from the hole or pipeline. Such data recording well tools are conventional, and are in use in the well and pipeline industry.

Normally, a drilled well is "logged" before casing is installed, in order to determine the exact depths of specific geological structures (e.g., impervious rock, oil and/or gas bearing strata, etc.). The information logged, as well as other information, such as the diameter or size of the casing, well name and/or number, depth of the well, etc., is entered into an information storage and retrieval system database, conventionally a computer 36 including appropriate programming for the application.

Thus, as the well downhole tool 24 passes each PRID or active device 30, 30a at each joint 14, 14a along the depth of the assembled well casing 10, each device 30, 30a responds with a signal which is relayed to the surface and ultimately to the computer 36. By "counting" the number of PRIDs or active devices 30, 30a which the well tool 24 has passed as it is lowered through the casing 10, and comparing each consecutive PRID 30, 30a with the corresponding data previously logged, the computer 36 can indicate the conditions at the location of the well downhole tool 24 in the well casing 10. As an example, previously logged data may indicate that an oil bearing stratum is located between 12,000 and 12,200 feet below the surface. As the length of each of the casing sections 12 is known, the computer 36 need only divide the depth of the stratum by the length of the casing sections 12 to determine how many casing sections 12 (and thus how many joints 14, with their associated PRIDs or active devices 30) lie between the surface and the desired stratum. This allows the well casing 10 to be perforated accurately at the desired strata, assuring that good flow of the desired substance is obtained without any mixture of undesired substances (water, etc.).

It will be seen that each of the PRIDs or active devices 30, 30a may be configured to provide a distinct and unique response, if desired, or at least several different responses may be provided for the plurality of PRIDs or active devices 30 used in the present invention. Such devices may be configured to provide different frequency responses, and/or modulation of the responses in some manner (amplitude, frequency, pulse) in order for each device to provide a distinct response.

In this manner, each PRID or active device 30, 30a, etc. may be installed along the casing or pipe string 10 with each providing a different response. The different responses corresponding to each of the PRIDs are entered into the computer 36. Thus, information is available as to the exact location of each independent PRID or active device 30, 30a, etc. This may be important in the event that the system misses a response by one or more of the devices 30 installed along the pipe casing 10. In such a situation, if all of the devices 30, 30a, etc. provided identical response signals, the missing of e.g., two of the PRID or active device response signals would result in an error of about sixty feet in the determination of the depth of the well tool 24. By providing each PRID with a distinct response signal, the computer 36 is able to determine the precise location of any given PRID or active device, even if a response signal was not received from one or more of the devices along the casing string 10.

It will further be seen that it is not absolutely essential to provide a separate and distinct response signal for each of the PRIDs or active devices 30 along the string 10. Provision for e.g., five different responses, with each identical response being installed five casing sections apart from one another in a repeating pattern, i.e., 1, 2, 3, 4, 5, 1, 2, 3, 4, 5, etc., would provide sufficient resolution for the location of the well tool 24 within the pipe or casing string 10, even in the event that responses from one or two, or even four consecutive, PRIDs or active devices 30 were not received. Thus, an accurate representation of the location of the well tool 24 at each joint 14 may be provided by the present invention.

While the discussion to this point has been directed to the well of FIGS. 1 and 2, it will be seen that the present invention is not limited only to use in generally vertical drilled wells and the like. The present method for determining position in a pipeline may be used in other pipeline environments, such as generally horizontal cross country gas, oil, or other fluid pipelines as desired, or in any pipeline orientation.

As an example of such use in a cross country pipeline, such lines are conventionally used for the transport of oil, gas, etc. between various points. It is necessary to inspect the interior of such lines from time to time, and this is conventionally accomplished by means of an automated tool, called a "pig," which is passed through the pipeline (generally "blown" through the line by increasing the pressure on one side of the pipeline relative to the tool). Such tools may include means of detecting various flaws within the pipeline, but may not include any means of determining their position in the line. Accordingly, a worker stationed along the pipeline logs the time when the "pig" passes, and travels to another point along the line where the process is repeated. When the "pig" is recovered from the pipeline, the data recorded by the conventional data recording means therein, is downloaded to some form of data recovery means (e.g., computer and database). The times at which any anomalies in the line were recorded by the data recording means in the "pig" are noted and compared to the times logged by the worker who noted the passage of the "pig" at various points along the line.

As can be seen, this provides only a very approximate idea of the position of the "pig" at any point where a pipeline anomaly was recorded, by interpolation of the times of passage at various points. Thus, the narrowing of the location where a more detailed inspection and/or repair is required, can be time consuming and costly. Moreover, such a system may result in the unnecessary replacement of a larger length of pipeline than is absolutely required, merely because the precise location of a flaw could not be accurately determined.

The present system provides a solution to the above problem, by means of installing a series of PRIDs or active radio frequency devices at various predetermined locations within the pipeline. Such PRIDs or active devices may be installed at joints in the pipeline, somewhat in the manner described above for the well casing or pipe, or in other areas of the pipeline as desired. The "pig" may include a transmitter and receiver similar to the conventional units which may be used in well downhole tools as described above, with the transmitter unit sending a continuous signal which is received by each of the radio frequency devices in turn as the "pig" travels through the pipeline. The devices sequentially provide responses as they are triggered by the transmitter in the "pig," with the receiver in the "pig" receiving the responding signals and the conventional recording means within the "pig" storing the location signals from the PRIDs or active devices, in a manner similar to that described above for well downhole tools having self contained recording means therein.

The data stored within the recording means, including the responding signals from the PRIDs or other active responding devices, is downloaded after the "pig" is recovered and is examined to determine if any flaws or other anomalies are present in the pipeline. If an anomaly is noted in the pipeline data, its location is easily determined relatively precisely by noting the PRID or active device signal at that location, or to either side of the location of the anomaly. Workers may then repair the problem as required, without need to spend substantial amounts of time and effort searching a relatively long length of pipeline for the problem, and/or replacing a large amount of the line in order to be sure that the problem was taken care of.

Figure 3:
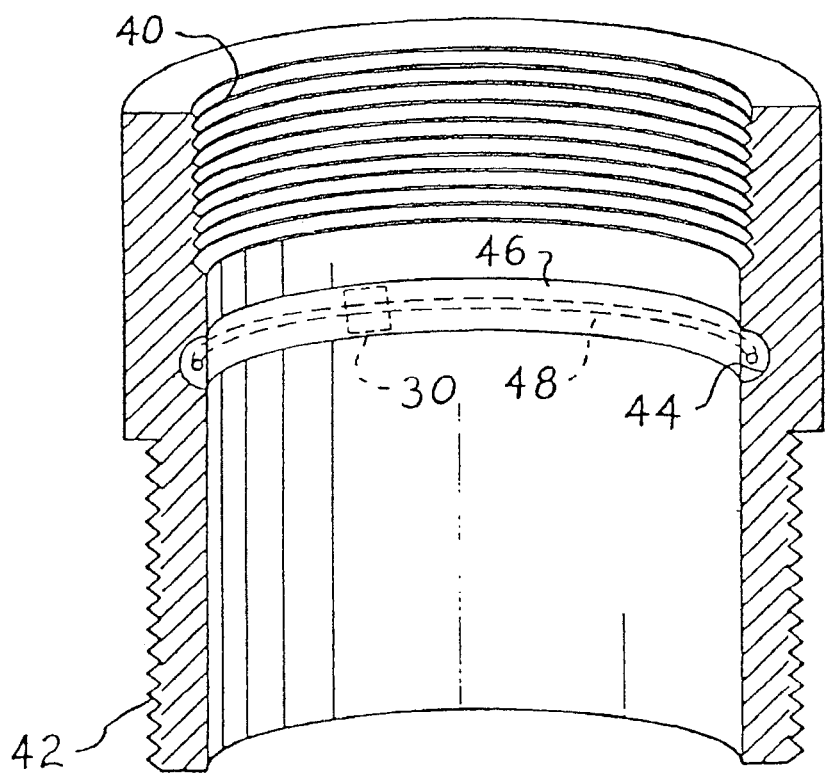
FIG. 3 is a side perspective view in section of a pipeline coupling incorporating a radio frequency identification device in accordance with the present invention.

It may be desirable to provide a separate, relatively short section of pipe which incorporates a responding device therein, and which may be added to an existing pipeline or string as desired. Such a unit 38, or "sub," is shown in section in FIG. 3 of the drawings. The "sub" unit 38 includes an internally threaded portion 40 at one end thereof and an externally threaded portion 42 at the end opposite the internally threaded portion 40, thus allowing the sub unit 38 to be assembled between two sections of pipe or string to act as a joint therebetween. The sub unit 38 is particularly configured for the installation of a PRID or active device therein, by means of the internal groove or channel 44 provided circumferentially about the interior of the unit 38. The channel 44 may include a PRID or other active radio frequency response device 30 imbedded therein, by means of a radio frequency transparent material 46 (e.g., resilient rubber or elastic material, plastic, etc.) installed within the groove or channel 44 for securing the PRID or active device 30 therein. In this manner, a series of such "sub" joints 38, with each including a PRID or active device 30, may be manufactured and installed in the field in a pipeline or well string, as desired. It will be noted that while threaded connecting ends 40 and 42 are illustrated for the sub joint 38 of FIG. 3, that other connecting means (flanges, etc.) may be provided as desired and in accordance with the configuration of the line in which the sub joint is to be installed, without departing from the scope of the present invention.

Figure 4:
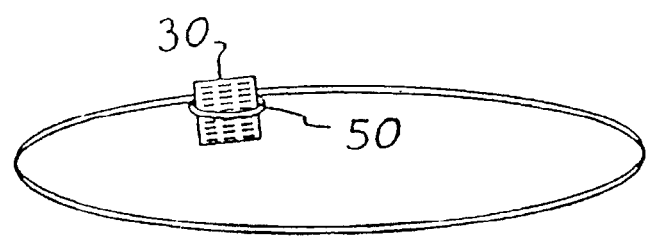
FIG. 4 is a perspective view of a radio frequency identification device and loop antenna for use with the present invention.

As noted further above, the signal strength of the responding devices (PRIDs or active devices) need not be particularly high, as the receiver in the pipeline tool will always be located quite close to the passive or active responding device. However, additional signal strength may be desirable in certain circumstances, particularly in the case of PRIDs which do not have any supplemental electrical power but rely upon the electromagnetic energy provided by the transmitted signal. Accordingly, it may be desirable to provide some means of enhancing the signal received for such PRIDs. One such means is disclosed in FIG. 4, where the PRID or active device 30 includes a circular loop antenna 48 installed therewith. The loop antenna 48 is configured to fit closely within a corresponding section or joint of the pipeline, casing, etc., as indicated by the section of loop antenna 48 shown installed in the section of sub joint 38 of FIG. 3.

The loop antenna 48 also includes a wrap or encircling portion 50 surrounding the corresponding PRID or active device 30 installed therewith. The relatively large antenna loop 48 (compared to the relatively small antenna of the PRID or other device 30, itself) is capable of receiving considerably greater signal strength from the transmitter as it passes that point in the pipe, as it completely surrounds the transmitter during the transmitter passage. The wrap of encircling antenna loop component 50 surrounding the PRID or active device 30, thus re-radiates the received signal to the device 30, thus providing a much stronger signal to the device 30 than would be the case without the supplementary loop antenna 48.

Figure 5:
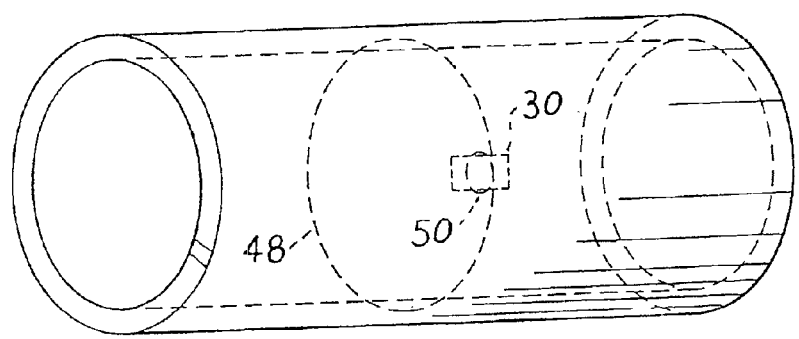
FIG. 5 is a perspective view of a sleeve installable in a pipe, including the identification device and loop of FIG. 4.

In some instances, it may not be possible or convenient to install a PRID or other radio frequency responding device 30 at a joint location in a pipeline or pipe string. Accordingly, FIG. 5 illustrates a means of installing such a responding device 30 at some intermediate point in a pipeline or string, without need for specialized pipe components. FIG. 5 illustrates a sleeve 52 formed of radio frequency transparent material (plastic, etc.) which may be installed within a pipeline or string. The sleeve 52 includes a PRID or active responding device 30 therein, and may also include an antenna loop 48 therein as well. As in the case of the responding device 30 and antenna loop 48 of FIG. 4, the antenna 48 may include a smaller loop 50 encircling the PRID or active device 30, and providing the benefits noted further above. The responding device 30 and antenna loop 48 may be encapsulated into the wall of the plastic sleeve 52 during manufacture.

As noted herein, the responding devices 30 may be of two classes. One class comprises PRIDs, or passive radio identification devices, which do not require any additional form of electrical power. However, the other class of active responding devices requires some form of electrical power to provide a responding radio frequency transmission. Accordingly, such devices also require some form of electrical power source. Conventional electrical storage batteries may be provided for such active devices, if so desired, with long battery life being achieved by means of "sleep" circuits in such active devices to reduce electrical power requirements to practically nil when no radio signal is being received.

Figures 6, 7:
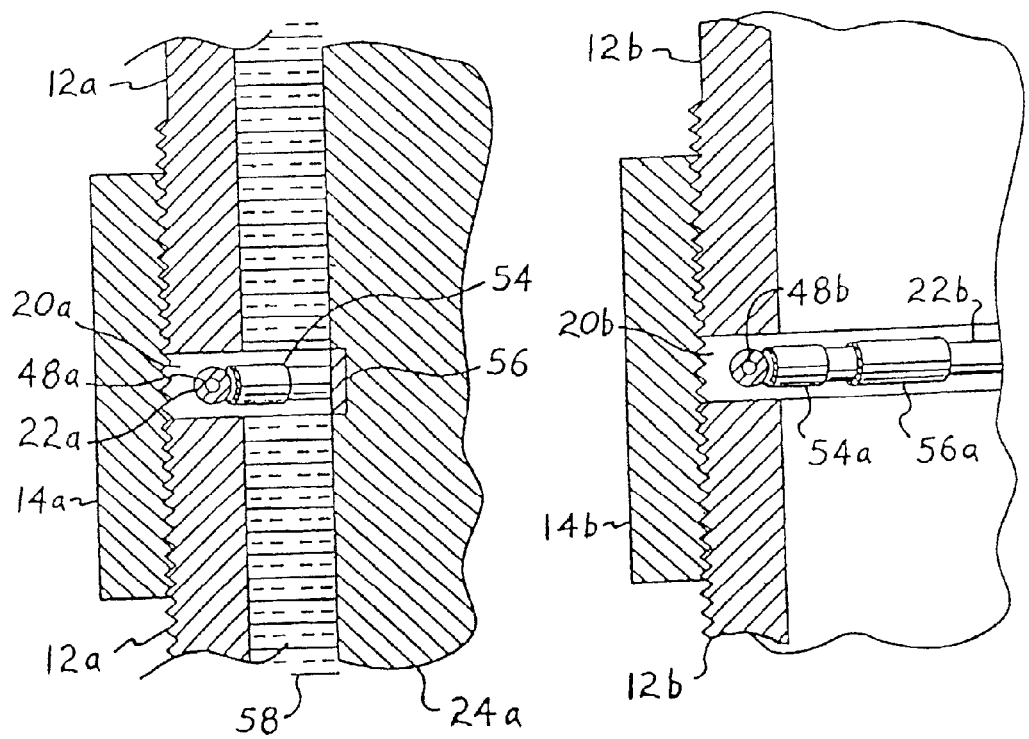
FIG. 6 is an elevation view in broken away section of a pipe incorporating the present identification device and loop antenna, and including electrochemical energy generation means having dissimilar metals disposed in the loop and in the detection tool.
FIG. 7 is an elevation view similar to that of FIG. 6, but having both dissimilar metals incorporated in the antenna loop.

However, the present invention may also include another means of generating electrical power for such active responding devices, as illustrated in FIGS. 6 and 7. FIGS. 6 and 7 show an O-ring, respectively 22a and 22b, installed within respective gaps 20a and 20b between pipe sections 12a, 12a and 12b, 12b and surrounded by a pipe coupling, respectively 14a and 14b in the two drawing Figures. FIG. 6 also illustrates a portion of a pipe or well tool 24a disposed within the pipe 12a. The groove or gap 20a of FIG. 6 includes a first electrochemically reactive metal component 54 therein, with the well or pipeline tool 24a including a second electrochemically reactive metal component 56 disposed to the outer surface thereof. The two metal components 54 and 56 are formed of dissimilar metals, e.g., copper and zinc, etc., having different electrolytic capacities.

The fluid 58 which flows through the pipeline or well bore casing 12a, normally provides some electrical conductivity and serves as an electrolyte for the dissimilar metals 54 and 56. (The fluid 58 is not shown in the gap 20a in FIG. 6, for clarity in the drawing Figure.) Accordingly, an electrical potential is developed between the two dissimilar metals 54 and 56, which may be used to provide the relatively small amount of electrical power required for the operation of an active radio identification device (not shown in FIGS. 6 and 7, but shown schematically in other drawing Figures). It is noted that while no electrical connections are shown in FIGS. 6 and 7, such connections are conventional and well known in the art.

As an example, a first electrical connector may be connected between one terminal of the active responding device and the first dissimilar metal component 54, with a mutual ground connector between the second terminal of the responding device and the second metal component 56 of the pipeline tool 24a, as by means of an electrical contact between the outer surface of the tool 24a and second terminal of the responding device. The electrolytic reaction of the dissimilar metals 54 and 56 and at least slightly electrolytically reactive fluid 58, results in a current flow between the two metals 54 and 56 and across the responding device, by means of the electrical contact between the tool 24a and second terminal of the responding device.

FIG. 7 illustrates a variation upon the assembly of FIG. 6, with the two dissimilar metal components 54a and 56a both being installed within the wall of the pipe 12b, in the gap 20b formed therein at the assembly joint. The fluid 58 flowing through the pipeline (not shown in FIG. 7, for clarity in the drawing Figure) flows around and past the two metal components 54a and 56a, thus serving as an electrolyte between the two. The two components 54a and 56a may be electrically connected to the terminals of an active radio identification device, as is conventionally done in the case of electrical storage battery power for such devices. However, the provision of the two electrochemically dissimilar metals 54a and 56a (or 54 and 56, in FIG. 6) serves to generate a certain amount of electrical energy, which is sufficient to supply the relatively small electrical energy needs of such active radio identification devices as used in the present invention.

In summary, the present method and apparatus for determining position in a pipeline provides a much needed system for easily and precisely determining the position of a well tool within a drilled oil, gas, or other well having a jointed well casing, or the position of a pipeline tool or "pig" within a pipeline. The present system is relatively simple and yet robust, with the PRID or active devices being used having great durability and reliability. The imbedding or sealing of each of the PRIDs or active devices within the resilient O-ring (rubber, Teflon; tm, etc.) located at each casing or pipe joint, provides further protection for the devices while simultaneously locating them precisely at each joint. The prior logging of the well hole characteristics, such as geological characteristics, depth of various strata of interest, well name and/or number, diameter of the casing to be used, etc., into a database, provides an operator at the surface with all information necessary to determine the appropriate action to take and the appropriate positioning of the tool for perforating the casing or other operations in the pipe.

It will be appreciated to those skilled in the art that the invention can be used in any type of pipe or casing, either vertically or horizontally oriented, and as found in refineries, chemical plants, oil and gas pipelines, underground water systems, or in any system where it is necessary to know the exact location of a tool or instrument being run through a pipe in any particular pipe system. The use of conventional self contained recording means within the well or pipeline tool, enables the present invention to be used with "slickline" type tools as well, as no electrical or other communication is required through the line. Accordingly, the present system will provide well drillers and operators, pipeline operators, and others working with similar systems, with a much needed means of quickly, easily, and relatively inexpensively, determining the precise location of a well tool in a well and correlating that location with previously logged information for accurate operations.

It is to be understood that the present invention is not limited to the sole embodiment described above, but encompasses any and all embodiments within the scope of the following claims.

I claim:

1. A fluid pipeline comprising:
   a pipe having a plurality of sections with adjoining sections defining a joint including a gap therebetween; and
   at least one radio frequency identification device installed within said pipe and configured to receive a radio frequency signal from a transmitter in the pipe and to provide a distinct response signal, wherein each of said at least one radio frequency identification device is installed within the gap of a different one of the joints defined between adjoining sections of the pipe.

2. The fluid pipeline of claim 1 wherein said pipe has a substantially horizontal orientation.

3. The fluid pipeline of claim 1 further comprising:
   a seal positioned in said joint.

4. The fluid pipeline of claim 1 wherein said at least one radio frequency identification device is sealed.

5. The fluid pipeline of claim 1 wherein said at least one radio frequency identification device is an active radio frequency identification device.

6. The fluid pipeline of claim 1 wherein said at least one radio frequency identification device is a passive radio frequency identification device.

7. The fluid pipeline of claim 1 wherein a plurality of radio frequency identification devices are installed within said pipe.

8. The fluid pipeline of claim 7 wherein said pipe has a plurality of joints and wherein each of said plurality of radio frequency identification devices is installed within the gap of a different joint of said plurality of joints.

9. The fluid pipeline of claim 7 wherein each of said plurality of radio frequency identification devices is sealed.

10. The fluid pipeline of claim 7 wherein the distinct response signal of one of said plurality of radio frequency identification devices is identical to the distinct response signal of another of said plurality of radio frequency identification devices.

11. The fluid pipeline of claim 7 wherein each of said plurality of radio frequency identification devices is an active radio frequency identification device.

12. The fluid pipeline of claim 7 wherein each of said plurality of radio frequency identification devices is a passive radio frequency identification device.

13. The fluid pipeline of claim 1 wherein at least one of said at least one radio frequency identification devices is sealed by means of a resilient O-ring seal positioned in the gap.

14. The fluid pipeline of claim 1 wherein the pipe is well casing.

15. The fluid pipeline of claim 14 wherein the well casing has a substantially horizontal orientation.

16. The fluid pipeline of claim 14 wherein each of the adjoining sections of the well casing are secured together by a separate coupling sleeve.

17. The fluid pipeline of claim 13 wherein the pipe is well casing.

18. The fluid pipeline of claim 17 wherein the well casing has a substantially horizontal orientation.

19. The fluid pipeline of claim 17 wherein each of the adjoining sections of the well casing are secured together by a separate coupling sleeve.

* * * * *